United States Patent
Bodino et al.

(10) Patent No.: US 12,221,551 B2
(45) Date of Patent: Feb. 11, 2025

(54) INK COMPOSITIONS

(71) Applicant: Dover Europe Sàrl, Vernier (CH)

(72) Inventors: Frederic Jean Alain Bodino, Lausanne (CH); Guillaume Falco, Vevey (CH)

(73) Assignee: Dover Europe Sàrl, Vernier (CH)

( * ) Notice: Subject to any disclaimer, the term of this patent is extended or adjusted under 35 U.S.C. 154(b) by 52 days.

(21) Appl. No.: 17/958,124

(22) Filed: Sep. 30, 2022

(65) Prior Publication Data

US 2024/0110075 A1  Apr. 4, 2024

(51) Int. Cl.
| | | |
|---|---|---|
| C09D 11/52 | (2014.01) | |
| C09D 11/033 | (2014.01) | |
| C09D 11/103 | (2014.01) | |
| C09D 11/107 | (2014.01) | |
| C09D 11/14 | (2006.01) | |
| C09D 11/36 | (2014.01) | |
| C09D 11/38 | (2014.01) | |

(52) U.S. Cl.
CPC ............ C09D 11/52 (2013.01); C09D 11/033 (2013.01); C09D 11/103 (2013.01); C09D 11/107 (2013.01); C09D 11/14 (2013.01); C09D 11/36 (2013.01); C09D 11/38 (2013.01)

(58) Field of Classification Search
CPC ...................................................... C09D 11/52
See application file for complete search history.

(56) References Cited

U.S. PATENT DOCUMENTS

| | | |
|---|---|---|
| 5,863,319 A | 1/1999 | Baker et al. |
| 5,891,228 A | 4/1999 | Baker et al. |
| 6,280,519 B1 | 8/2001 | Yezrielev et al. |
| 6,462,117 B1 | 10/2002 | Pourreau et al. |
| 6,702,884 B2 | 3/2004 | Brown |
| 7,192,121 B2 | 3/2007 | Barbet et al. |
| 7,465,759 B1 | 12/2008 | Salisbury et al. |
| 8,162,450 B2 | 4/2012 | Barbet |
| 8,282,724 B2 | 10/2012 | Goustiaux et al. |
| 8,501,835 B2 | 8/2013 | Kim et al. |
| 8,540,350 B2 | 9/2013 | Barbet |
| 8,961,680 B2 | 2/2015 | Pasin et al. |
| 9,944,819 B1 | 4/2018 | Roh |
| 11,248,138 B2 | 2/2022 | Pan et al. |
| 2013/0307891 A1 | 11/2013 | Barbet et al. |
| 2014/0168322 A1 | 6/2014 | Bonneton |
| 2021/0017411 A1* | 1/2021 | Beltrame ............... C09D 11/52 |

FOREIGN PATENT DOCUMENTS

KR 20200120307 10/2020

* cited by examiner

Primary Examiner — William D Young
(74) Attorney, Agent, or Firm — Fish & Richardson P.C.

(57) ABSTRACT

This disclosure relates to an ink composition (e.g., a continuous inkjet ink composition) that can be free of volatile organic compounds as defined by the US EPA. This disclosure also relates to a continuous printing process using such a composition.

14 Claims, 5 Drawing Sheets

INK COMPOSITIONS

TECHNICAL FIELD

This disclosure relates to ink compositions, as well as related products and processes.

BACKGROUND

Inkjet printing is a well-known technique, which allows the printing, marking or decoration of all types of objects, at high speed, and without these objects coming into contact with the printing device.

Inkjet printing systems can be divided into two main types: "Drop on demand" (DOD) or "continuous ink jet" (CIJ). In general, CIJ techniques (e.g., continuous deflected jet techniques) can include sending an ink, under pressure, into a cavity containing a piezoelectric crystal, from where the ink escapes via an orifice (nozzle) in the form of a jet (or a stream). The piezoelectric crystal, vibrating at a given frequency, can cause pressure disturbances in the inkjet, which oscillates and gradually breaks up the ink jet into spherical drops or droplets. An electrode can be placed in the path of the jet (e.g., where it breaks up) to make it possible to give these drops an electrostatic charge, if the ink is conductive. The drops thus charged can then be deflected in an electric field and allow the printing. The drops that are not charged, and therefore are not deflected, can be recovered in a gutter or a drop collector where the ink is recycled to the ink circuit.

This type of inkjet spraying provides contactless marking at high throughput speed on objects that are not necessarily planar and with the possibility of changing the message at will. The technique is particularly suited for the marking and identification (expiry dates, serial numbers, batch numbers, bar codes etc.) of industrial products on production lines.

Ink compositions suitable for CIJ typically need to satisfy a certain number of criteria such as those relating to the viscosity, the electrical conductivity, the solubility in a solvent for cleaning, the compatibility of the ingredients, and the correct wetting of the supports to be marked.

SUMMARY

This disclosure is based on the unexpected discovery that certain ink compositions (e.g., continuous inkjet ink compositions) can provide a relatively low amount of volatile organic compounds (VOC) (e.g., VOC free) and have sufficient polarity to dissociate and dissolve conductive salts. Such ink compositions can be used as VOC free inks in a continuous printing process.

In one aspect, this disclosure features an inkjet ink composition that includes at least two solvents containing dimethyl carbonate and acetone, wherein the weight ratio between dimethyl carbonate and acetone is from about 50:50 to about 80:20; at least one conductive agent; at least one resin; and at least one colorant.

In another aspect, this disclosure features an inkjet ink composition that includes a solvent mixture comprising dimethyl carbonate and acetone only, wherein acetone is from about 20 wt % to about 50 wt % of the total weight of the solvent mixture and dimethyl carbonate is from about 50 wt % to about 80 wt % of the solvent mixture; at least one conductive agent; at least one resin; and at least one colorant.

In another aspect, this disclosure features an inkjet ink composition that includes a solvent mixture comprising dimethyl carbonate and acetone only, wherein acetone is from about 10 wt % to about 40 wt % of the total weight of the ink composition and dimethyl carbonate is from about 40 wt % to about 80 wt % of the total weight of the ink composition; at least one conductive agent; at least one resin; and at least one colorant.

In another aspect, this disclosure features an inkjet ink composition that includes at least two solvents comprising dimethyl carbonate and acetone; at least one conductive agent; at least one resin; and at least one colorant; wherein the composition is substantially free of an acetal, a non-carbonate ester, or an alcohol.

In another aspect, this disclosure features an inkjet ink composition consisting of dimethyl carbonate; acetone; at least one conductive agent; at least one resin; and at least one colorant.

In still another aspect, this disclosure features a printing process that includes ejecting an ink composition described herein from a printhead in an ink jet printer continuously to form an ink stream.

Other features, objects, and advantages will be apparent from the description, drawings, and the claims.

DETAILED DESCRIPTION

This disclosure generally relates to ink compositions that can be used in a continuous printing process.

In general, the ink compositions described herein can contain at least two solvents (e.g., organic solvents), at least one conductive agent, at least one resin, and at least one colorant.

In some embodiments, the ink compositions described herein can contain a solvent mixture that includes at least two (e.g., three or four) solvents. In some embodiments, the solvents described herein are solvents that are considered as free of volatile organic compounds ("VOC") as defined by the U.S. Environmental Protection Agency (EPA). As used herein, the term "VOC" refers to volatile organic compounds that undergo photochemical reaction in air (e.g., with nitrogen oxides) to form ozone. As used herein, the "VOC free solvents" mentioned herein refers to solvents that have negligible photochemical reactivity, are determined by the EPA as not contributing appreciably to ozone formation, and are granted VOC exempt status by the EPA. Similarly, as used herein, an ink composition that is "VOC free" refers to an ink composition that does not substantially release VOC as defined by the EPA (i.e., a volatile organic compound contributing to ozone formation). Suitable examples of VOC free solvents include dimethyl carbonate and acetone. Other VOC free solvents (or low ozone-forming solvents) can be found, e.g., in U.S. Pat. No. 6,280,519.

In some embodiments, the at least two solvents described herein include dimethyl carbonate and acetone. Without wishing to be bound by theory, it is believed that dimethyl carbonate alone is not polar enough to dissociate and dissolve the conductive agent (e.g., a salt) in the ink compositions described herein and that acetone is too volatile, which can result in a relative high consumption of the solvent by evaporation during manufacturing and storage of the ink compositions. Without wishing to be bound by theory, it is believed that incorporating a combination dimethyl carbonate and acetone in an ink composition can resolve both issues mentioned above and can result in a VOC-free ink composition having suitable volatility and a sufficiently high polarity to dissolve a conductive agent, thereby allowing the ink composition to be suitable for use in a CIJ printing process. In addition, without wishing to be bound by theory, it is believed that increasing the amount of acetone in an ink composition generally increase the conductivity of the ink composition.

In some embodiments, the weight ratio (or weight percentage ratio) between dimethyl carbonate and acetone can range from at least about 50:50 (e.g., at least about 51:49, at least about 52:48, at least about 53:47, at least about 54:46, at least about 55:45, at least about 56:44, at least about 57:43, at least about 58:42, at least about 59:41, at least about 60:40, at least about 61:39, at least about 62:38, at least about 63:37, at least about 64:36, at least about 65:35, at least about 66:34, at least about 2:1, at least about 67:33, at least about 68:32, at least about 69:31, or at least about 70:30) to at most about 80:20 (e.g., at most about 79:21, at most about 78:22, at most about 77:23, at most about 76:24, at most about 75:25, at most about 74:26, at most about 73:27, at most about 72:28, at most about 71:29, or at most about 70:30). Without wishing to be bound by theory, it is believed that an ink composition containing dimethyl carbonate and acetone in the above weight ratio can have suitable volatility and a sufficiently high polarity to dissolve a conductive agent, thereby allowing the ink composition to be suitable for use in a CIJ printing process.

In some embodiments, the dimethyl carbonate can be in an amount of from at least about 50 wt % (e.g., at least about 52 wt %, at least about 54 wt %, at least about 55 wt %, at least about 56 wt %, at least about 58 wt %, at least about 60 wt %, at least about 62 wt %, at least about 64 wt %, at least about 65 wt %, at least about 66 wt %, at least about 68 wt %, or at least about 70 wt %) to at most about 80 wt % (e.g., at most about 79 wt %, at most about 78 wt %, at most about 77 wt %, at most about 76 wt %, at most about 75 wt %, at most about 74 wt %, at most about 73 wt %, at most about 72 wt %, at most about 71 wt %, or at most about 70 wt %) of the total weight of the solvent mixture.

In some embodiments, the dimethyl carbonate can be in an amount of from at least about 40 wt % (e.g., at least about 42 wt %, at least about 44 wt %, at least about 45 wt %, at least about 46 wt %, at least about 48 wt %, at least about 50 wt %, at least about 52 wt %, at least about 54 wt %, at least about 55 wt %, at least about 56 wt %, at least about 58 wt %, or at least about 60 wt %) to at most about 80 wt % (e.g., at most about 78 wt %, at most about 76 wt %, at most about 75 wt %, at most about 74 wt %, at most about 72 wt %, at most about 70 wt %, at most about 68 wt %, at most about 66 wt %, at most about 65 wt %, at most about 64 wt %, at most about 62 wt %, or at most about 60 wt %) of the total weight of the ink composition.

Without wishing to be bound by theory, it is believed that an ink composition containing dimethyl carbonate in the above amount can have a suitable volatility and does not release an excessive amount of a volatile solvent.

In some embodiments, the acetone can be in an amount of from at least about 20 wt % (e.g., at least about 21 wt %, at least about 22 wt %, at least about 23 wt %, at least about 24 wt %, at least about 25 wt %, at least about 26 wt %, at least about 27 wt %, at least about 28 wt %, at least about 29 wt %, or at least about 30 wt %) to at most about 50 wt % (e.g., at most about 48 wt %, at most about 46 wt %, at most about 45 wt %, at most about 44 wt %, at most about 42 wt %, at most about 40 wt %, at most about 38 wt %, at most about 36 wt %, at most about 35 wt %, at most about 34 wt %, at most about 32 wt %, or at most about 30 wt %) of the total weight of the solvent mixture.

In some embodiments, the acetone can be in an amount of from at least about 10 wt % (e.g., at least about 12 wt %, at least about 14 wt %, at least about 15 wt %, at least about 16 wt %, at least about 18 wt %, at least about 20 wt %, at least about 22 wt %, at least about 24 wt %, at least about 25 wt %, at least about 26 wt %, at least about 28 wt %, or at least about 30 wt %) to at most about 40 wt % (e.g., at most about 38 wt %, at most about 36 wt %, at most about 35 wt %, at most about 34 wt %, at most about 32 wt %, at most about 30 wt %, at most about 28 wt %, at most about 26 wt %, at most about 25 wt %, at most about 24 wt %, at most about 22 wt %, or at most about 20 wt %) of the total weight of the ink composition.

Without wishing to be bound by theory, it is believed that an ink composition containing acetone in the above amount can have a sufficiently high polarity to dissolve a conductive agent, thereby allowing the ink composition to be suitable for use in a CIJ printing process.

In some embodiments, the ink compositions described herein can include a solvent mixture that includes dimethyl carbonate and acetone only. In other embodiments, the ink compositions described herein can include one or more solvents (e.g., organic solvents) in addition to dimethyl carbonate and acetone. In some embodiments, the one or more additional solvents are VOC free solvents, i.e., solvents that are granted VOC exempt status by the EPA.

In some embodiments, the total amount of the solvents in the ink compositions described herein can range from at least about 55 wt % (e.g., at least about 60 wt %, at least about 65 wt %, at least about 70 wt %, at least about 75 wt %, at least about 80 wt %, at least about 82 wt %, at least about 84 wt %, at least about 85 wt %, at least about 86 wt %, at least about 88 wt %, or at least about 90 wt %) to at most about 95 wt % (e.g., at most about 94 wt %, at most about 92 wt %, at most about 90 wt %, at most about 88 wt %, at most about 86 wt %, at most about 84 wt %, at most about 82 wt %, at most about 80 wt %, at most about 75 wt % or at most about 70 wt %) of the ink compositions.

In some embodiments, the ink compositions described herein can be substantially free of one or more solvents or compounds. For example, the ink compositions described herein can be substantially free of water, a hydrocarbon (e.g., toluene, xylene, or mineral spirit), an acetal (e.g., a non-cyclic acetal), a monoester or a non-carbonate ester (e.g., methyl acetate, ethyl acetate, propyl acetate, butyl acetate, or propylene glycol monomethyl ether acetate), an alcohol (e.g., methanol, ethanol, isopropyl alcohol, butanol, pentanol, or benzyl alcohol), an ether (e.g., methyl t-butyl ether), a ketone (e.g., a C4-C10 ketone or a cyclic ketone), a fluorine-containing compound (e.g., parachlorobenzotrifluoride), a chloride or bromide salt, an initiator (e.g., an azo compound), or a compound having a boiling point greater than or equal to 160° C. As used herein, a compound that is "substantially free" from an ink composition refers to a compound that is not intentionally added into the ink composition. In some embodiments, the ink compositions described herein can have at most about 1000 ppm (e.g., at most about 500 ppm, at most about 250 ppm, at most about 100 ppm, at most about 50 ppm, at most about 10 ppm, or at most about 1 ppm) of one or more of the above compounds that are substantially free from the ink compositions. In some embodiments, the ink compositions described herein can be completely free of one or more the above compounds.

In some embodiments, the ink compositions described herein can include at least one (e.g., two, three, or four) conductive agent. In some embodiments, the conductive agent can be a salt (e.g., an organic salt or an inorganic salt). For example, the salt can be a quaternary phosphonium salt, a quaternary ammonium salt, a tetrafluoroborate salt, an imidazolium salt, a thiocyanate salt, or an alkali salt.

Exemplary quaternary phosphonium salts include tetraalkylphosphonium salts and tetraarylphosphonium salts (e.g., tetraphenylphosphonium salts). Commercially available tetraalkylphosphonium salts include CYPHOS series of compounds, such as trihexyl(tetradecyl)phosphonium bis-2,4,4-(trimethylpentyl) phosphinate (CYPHOS IL 104), trihexyl (tetradecyl)phosphonium dicyanamide (CYPHOS IL 105), triisobutyl(methyl)phosphonium tosylate (CYPHOS IL 106), tributyl(methyl)phosphonium methylsulfate (CYPHOS IL 108), trihexyl(tetradecyl)phosphonium bistriflamide (CYPHOS IL 109), tributyl(ethyl)phosphonium diethylphosphate (CYPHOS IL 169), all of which are available from Cytec Industries Inc., Woodland Park, NJ.

Exemplary quaternary ammonium salts include tetraalkylammonium salts and tetraarylammonium salts (e.g., tetraphenylphosphonium salts). Specific examples include tetramethylammonium salts (e.g., tetramethylammonium hexafluorophosphate or tetramethylammonium tetrafluoroborate), tetraethylammonium salts (e.g., tetraethylammonium hexafluorophosphate or tetraethylammonium tetrafluoroborate), tetrabutylammonium salts (e.g., tetrabutylammonium hexafluorophosphate or tetrabutylammonium tetrafluoroborate), or tetraphenylammonium salts (e.g., tetraphenylammonium hexafluorophosphate or tetraphenylammonium tetrafluoroborate).

Exemplary imidazolium salts include 1-butyl-3-methylimidazolium iodide, 1-methyl-3-propylimidazolium iodide, 1-butyl-3-methylimidazolium thiocyanate, 1-butyl-3-methylimidazolium hexafluorophosphate, or 1-butyl-3-methylimidazolium tetrafluoroborate.

Exemplary alkali salts include lithium salts (e.g., lithium nitrate, lithium iodide, lithium acetate, lithium methoxide, lithium thiocyanate, or lithium triflate), sodium salts (e.g., sodium nitrate, sodium iodide, sodium acetate, sodium methoxide, sodium thiocyanate, sodium hexafluorophosphate, or sodium triflate), potassium salts (e.g., potassium nitrate, potassium iodide, potassium acetate, potassium methoxide, potassium thiocyanate, potassium hexafluorophosphate, or potassium triflate), or cesium salts (e.g., cesium nitrate, cesium iodide, cesium acetate, cesium methoxide, cesium thiocyanate, or cesium triflate).

In some embodiments, the conductive agent is a liquid electrolyte at ambient temperature. As mentioned herein, the "ambient temperature" is defined as a temperature from about 20° C. to about 25° C.

In some embodiments, the ink compositions described herein can include an amount of the conductive agent that is sufficient to produce a dipole under an electric field (e.g., an electrostatic field). In some embodiments, the conductive agent can be in an amount of from at least about 0.05 wt % (e.g., at least about 0.1 wt %, at least about 0.25 wt %, at least about 0.5 wt %, at least about 1 wt %, at least about 1.5 wt %, at least about 2 wt %, at least about 2.5 wt %, or at least about 3 wt %) to at most about 5 wt % (e.g., at most about 4.5 wt %, at most about 4 wt %, at most about 3.5 wt %, at most about 3 wt %, at most about 2.5 wt %, at most about 2 wt %, at most about 1.5 wt %, or at most about 1 wt %) of the ink compositions described herein. Without wishing to be bound by theory, it is believed that, in some embodiments, the amount of an inorganic salt can be less than the amount of an organic salt to achieve the same conductivity in the hot melt ink composition.

In some embodiments, the ink compositions described herein can have a suitable conductivity. For example, the ink compositions can have a conductivity of at most about 3500 $\mu$S/cm (e.g., at most about 3000 $\mu$S/cm, at most about 2500 $\mu$S/cm, at most about 2000 $\mu$S/cm, at most about 1500 $\mu$S/cm, at most about 1400 $\mu$S/cm, at most about 1200 $\mu$S/cm, at most about 1000 $\mu$S/cm, at most about 900 $\mu$S/cm, at most about 800 $\mu$S/cm, at most about 700 $\mu$S/cm, at most about 600 $\mu$S/cm, or at most about 500 $\mu$S/cm) and/or at least about 5 $\mu$S/cm (e.g., at least about 10 $\mu$S/cm, at least about 15 $\mu$S/cm, at least about 20 $\mu$S/cm, at least about 25 $\mu$S/cm, at least about 50 $\mu$S/cm, at least about 100 $\mu$S/cm, at least about 200 $\mu$S/cm, at least about 300 $\mu$S/cm, at least about 400 $\mu$S/cm, at least about 500 $\mu$S/cm, at least about 600 $\mu$S/cm, at least about 700 $\mu$S/cm, or at least about 800 $\mu$S/cm) at 20° C. In some embodiments, the ink compositions described herein can have substantially no conductivity (i.e., having a conductivity of 0 S/cm). Without wishing to be bound by theory, it is believed that the conductivity of the ink compositions described herein can depend on the polarity of the other ingredients (e.g., a solvent) in the compositions. For example, it is believed that an ink composition having a more polar ingredient (e.g., a more polar solvent) can have a higher conductivity compared to an ink composition having the same amount of a less polar ingredient (e.g., a less polar solvent) when other components (e.g., the conductive agent, the colorant, and the resin) and their amounts in the two ink compositions are the same. As another example, it is believed that an ink composition having a larger amount of a polar ingredient (e.g., a polar solvent) can have a higher conductivity compared to an ink composition having a smaller amount of the same ingredient when other components (e.g., the conductive agent, the colorant, and the resin) and their amounts in the two ink compositions are the same.

In some embodiments, the ink compositions described herein can include at least one (e.g., two, three, or four) colorant, such as a dye or a pigment. The dye or pigment can be either an organic or inorganic material. Examples of dyes include anthraquinone and perinone reds such as solvent red 172, solvent red 111, solvent red 222, solvent red 207, and solvent red 135; anthraquinone blues such as solvent blue 104, solvent violet 13; anthraquinone greens such as solvent green 3 and solvent green 5; xanthane, quinoline, quinophthalone, pyrazolone, methine, and anthraquinoid yellows such as solvent yellow 98, solvent yellow 33, disperse yellow 54, solvent yellow 93, disperse yellow 82, and solvent yellow 163; and black dyes such as solvent black 3, solvent black 27, and solvent black 29. Examples of pigments include pigment blues (PB) 15, 15:3, 15:4, 16, 22, 28, 64, 68; pigment reds (PR) 3, 4, 48, 81, 97, 113, 122, 175, 202, 217; pigment yellows (PY) 2, 7, 53, 111, 155, 151, 175, 194; pigment blacks 7, carbon black, graphite; and pigment white (e.g., titanium dioxide). Other exemplary dyes or pigments have been described in, e.g., U.S. Pat. Nos. 6,702,884, 5,863,319, and 5,891,228.

In some embodiments, the colorant can be in an amount of from at least about 0.5 wt % (e.g., at least about 1 wt %, at least about 2 wt %, at least about 4 wt %, at least about 5 wt %, at least about 6 wt %, at least about 8 wt %, at least about 10 wt %, at least about 12 wt %, at least about 14 wt %, or at least about 15 wt %) to at most about 20 wt % (e.g., at most about 18 wt %, at most about 16 wt %, at most about 15 wt %, at most about 14 wt %, at most about 12 wt %, at most about 10 wt %, at most about 8 wt %, at most about 6 wt %, at most about 5 wt %, at most about 4 wt %, at most about 2 wt %, or at most about 1 wt %) of the ink compositions described herein.

In some embodiments, the ink compositions described herein can at least one (e.g., two, three, or four) resin. The resin can provide the ink composition with a desired viscosity, thermal stability, flexibility, and adhesion properties. In some embodiments, the resin can serve as a binder in the ink compositions described herein. Examples of resins include highly stabilized rosin ester; coumarone-indene resins; p, alpha-dimethylstyrene; gum elemi; ethylene oxide polymer and its adducts; ethylene oxide/propylene oxide copolymer and its adducts; cellulose resins, including methyl cellulose resins, hydroxypropyl cellulose resins, hydroxypropyl methylcellulose resin, and cellulose ester resins (e.g., cellulose acetate butyrate); acrylic polymers; novolac resins; isobutylene-isoprene copolymer; polyacrylamide; modified polyacrylamide resin; polylimonene; polyisobutylene; polymaleic acid; polyoxyethylene derivatives; polypropylene glycol; polyvinyl acetate; polyvinyl alcohol; polyvinyl polypyrrolidone; polyvinyl pyrrolidone; rosin, partially hydrogenated; rosin and rosin derivatives; rosin, polymerized, glycerol ester; rosin, tall oil, glycerol ester; styrene; styrene terpolymers; styrene copolymers; sucrose acetate isobutyrate; terpene resins, natural and synthetic; turpentine gum; vinylacetate; and vinyl chloride-vinylidene chloride copolymer.

In general, the ink compositions described herein can include enough resin to achieve the desired viscosity, stability, flexibility, and adhesion. In some embodiments, the resin can be in an amount of at least about 1 wt % (e.g., at least about 2 wt %, at least about 4 wt %, at least about 5 wt %, at least about 6 wt %, at least about 8 wt %, at least about 10 wt %, at least about 12 wt %, at least about 14 wt %, or at least about 15 wt %) to at most about 30 wt % (e.g., at most about 28 wt %, at most about 26 wt %, at most about 25 wt %, at most about 24 wt %, at most about 22 wt %, at most about 20 wt %, at most about 18 wt %, at most about 16 wt %, at most about 15 wt %, at most about 14 wt %, at most about 12 wt %, at most about 10 wt %, at most about 8 wt %, at most about 6 wt %, or at most about 5 wt %) of the ink compositions described herein.

In some embodiments, the ink compositions described herein can have a suitable viscosity. In some embodiments, the ink compositions can have a viscosity of at least about 2 mPa·s (e.g., at least about 2.5 mPa·s, at least about 3 mPa·s, at least about 3.5 mPa·s, at least about 4 mPa·s, at least about 4.5 mPa·s, or at least about 5 mPa·s) and/or at most about 25 mPa·s (e.g., at most about 20 mPa·s, at most about 15 mPa·s, at most about 10 mPa·s, at most about 8 mPa·s, at most about 6 mPa·s, or at most about 5 mPa·s) at 20° C. The viscosity mentioned herein refers to the shear viscosity measured by using a shear rate of 73 $s^{-1}$ at 20° C. as described in standard DIN 53019-1 (e.g., by using a viscometer with coaxial cylinders of the "Couette" type available from Contraves).

In some embodiments, the ink compositions described herein can have a suitable density. In some embodiments, the ink compositions can have a density of at least about 0.8 g/mL (e.g., at least about 0.85 g/mL, at least about 0.9 g/mL, at least about 0.95 g/mL, or at least about 1 g/mL) and/or at most about 1.2 g/mL (e.g., at most about 1.15 g/mL, at most about 1.1 g/mL, at most about 1.05 g/mL, or at most about 1 g/mL) at 20° C.

In some embodiments, the ink compositions described herein can release a relative low amount of VOC or can be VOC free. In some embodiments, the ink compositions described herein can release VOC in an amount of at most about 16 wt % (e.g., at most about 15 wt %, at most about 14 wt %, at most about 12 wt %, at most about 10 wt %, at most about 8 wt %, at most about 6 wt %, at most about 5 wt %, at most about 4 wt %, at most about 2 wt %, or at most about 1 wt %) or 0 wt % of the total weight of the compositions. In some embodiments, the ink compositions described herein can release VOC in an amount of at most about 80 wt % (e.g., at most about 70 wt %, at most about 60 wt %, at most about 50 wt %, at most about 40 wt %, at most about 30 wt %, at most about 20 wt %, at most about 10 wt %, at most about 5 wt %, or at most about 1 wt %) or 0 wt % of the total weight of the solids in the compositions.

In some embodiments, the ink compositions described herein can include particles. The particles can be colorants (e.g., dispersed dyes or pigments) or other components in the ink compositions. In some embodiments, the particles can be suspended in an ink composition. In some embodiments, the particles can have a relative large particle diameter. In some embodiments, the particles can have an average particle diameter of at least about 100 nm (e.g., at least about 150 nm, at least about 200 nm, at least about 250 nm, or at least about 300 nm) and/or at most about 500 nm (e.g., at most about 450 nm, at most about 400 nm, at most about 350 nm, or at most about 300 nm).

In some embodiments, the ink compositions described herein can optionally further include at least one tackifier, at least one plasticizer, at least one surfactant, at least one antifoaming agent, and/or at least one dispersant.

In some embodiments, the ink compositions described herein can optionally include at least one (e.g., two, three, or four) tackifier. In general, a tackifier can improve adhesion between the ink composition and a substrate (e.g., a cardboard or a metallic or polymeric film). Examples of tackifiers include glycerol esters, pentaerythritol esters, hydrocarbons, rosin, rosin esters, modified rosin esters (e.g., hydrogenated, acid, or phenolic-modified rosin esters), cumarone-indene polymers, cyclic ketone polymers, styrene allyl alcohol polymers, polystyrenes, polyvinyl toluene/methylstyrene polymers, polyvinyl chloride, polyvinyl alcohol, ethylene/vinyl acetate, ethylene/acrylic acid, alkyl hydrocarbon polymers, aryl hydrocarbon polymers, alkyl aryl hydrocarbon polymers, terpene polymers, ethylene carbon monoxide copolymers, vinyl chloride/vinyl alcohol copolymers, polyvinyl butyral, polyketones, styrene/acrylic copolymers, polybutenes, polybutadienes, styrene-isoprene-styrene, styrene-butadiene-styrene, polyvinyl pyrrolidone, polyvinyl pyridine, vinyl pyrrolidone/vinyl acetate, polyurethanes, polyesters, polyamides, cellulose esters, cellulose ethers, polyols, styrene-acrylates, polypropylene, chlorinated polypropylene, chlorinated paraffin, gilsonite and other asphaltic materials, cyclic hydrocarbon polymer, halogenated polymers, acrylics, epoxides, novolacs, and other synthetic and natural resins. A commercially available tackifier is polyterpene available from Goodyear under the trade name Wingtack 86. In some embodiments, the tackifier can be in an amount of from at least about 1 wt % (e.g., at least about 5 wt %, at least about 10 wt %, or at least about 15 wt %) to at most about 25 wt % (e.g., at most about 20 wt %, at most about 15 wt %, at most about 10 wt %, or at most about 5 wt %) of ink compositions described herein.

In some embodiments, the ink compositions described herein can optionally include at least one (e.g., two, three, or four) plasticizer. In general, a plasticizer can increase the flexibility of the ink composition. Examples of plasticizers include aromatic sulfonamides, phthalates, acetates, adipates, amides, azelates, epoxides, glutarates, laurates, oleates, sebacates, stearates, sulfonates, tallates, phosphates, benzoin ethers, and trimellitates. In some embodiments, the plasticizer can be in an amount of from at least about 1 wt % (e.g., at least about 2 wt %, at least about 4 wt %, at least about 6 wt %, or at least about 8 wt %) to at most about 10 wt % (e.g., at most about 9 wt %, at most about 7 wt %, at most about 5 wt %, or at most about 3 wt %) of the ink compositions described herein.

In some embodiments, the ink compositions described herein can optionally include at least one (e.g., two, three, or four) surfactant. Examples of surfactants include siloxanes, fluorocarbon esters or fluorinated esters, and alkylphenoxy alkyleneoxides. In some embodiments, the surfactant can be in an amount of from at least about 0.01 wt % (e.g., at least about 0.05 wt %, at least about 0.1 wt %, at least about 0.5 wt %, or at least about 1 wt %) to at most about 3 wt % (e.g., at most about 2.5 wt %, at most about 2 wt %, at most about 1.5 wt %, or at most about 1 wt %) of the ink compositions described herein.

In some embodiments, the ink compositions described herein can optionally include at least one (e.g., two, three, or four) antifoaming agent. An example of a suitable antifoaming agent is BYK™ 065 from BYK-Chemie USA. In some embodiments, the antifoaming agent can be in an amount of from at least about 0.01 wt % (e.g., at least about 0.05 wt %, at least about 0.1 wt %, at least about 0.5 wt %, or at least about 1 wt %) to at most about 3 wt % (e.g., at most about 2.5 wt %, at most about 2 wt %, at most about 1.5 wt %, or at most about 1 wt %) of the ink compositions described herein.

In some embodiments, the ink compositions described herein can optionally include at least one (e.g., two, three, or four) dispersant. In general, a dispersant can assist in stabilizing an insoluble component (e.g., a colorant) in the ink composition. For example, the dispersant can prevent agglomeration of a colorant (e.g., a pigment) in the ink composition. Examples of dispersants include Solsperse 13,650, 13,940, 17,000, J910; Byk 108; Tego Dispers 700; UNIQEMA 5543; and EFKA 5244, 5207, 6750; which are all commercially available from Lubrizol; Byk Chemie; Tego Chemie; Croda; and BASF, respectively. In some embodiments, the dispersant can be in an amount of from at least about 0.5 wt % (e.g., at least about 1 wt %, at least about 2 wt %, at least about 4 wt %, at least about 6 wt %, or at least about 8 wt %) to at most about 10 wt % (e.g., at most about 9 wt %, at most about 7 wt %, at most about 5 wt %, or at most about 3 wt %) of the ink compositions described herein.

Printing Processes and Products

In general, the ink compositions described herein can be used in a printing process that includes ejecting an ink composition described herein from a printhead in an ink jet printer continuously to form an ink stream.

In some embodiments, the ink stream ejected from the printhead can be deflected by at least one (e.g., two, three, four or more) deflection electrode to direct the ink stream to an ink recovery gutter. In such embodiments, the process can further include forming ink drops that are substantially not deflected by the deflection electrode and directing the ink drops that are substantially not deflected to a substrate to form an image.

In some embodiments, the principle of the printing process described in the preceding paragraph can be summarized as follows: a continuous ink stream ejected from a printhead is deflected by at least one electrode to which a static or sinusoidal high voltage is applied. Most of the ink stream is not printed and is directed to an ink recovery gutter. During printing, segments of the ink stream are sampled asynchronously, deviated differently depending on their length (the length providing a means of varying the distribution of embedded electrical charge per unit length) and directed towards the substrate. These segments, which can be transformed into spherical drops under the effect of the surface tension, are separated from the jet before they are deflected such that their trajectory is different from the ink stream. In such a printing process, the unused ink stream can be deflected by at least one deflection electrode to direct the ink stream to an ink recovery gutter, while the ink used to form an image is not deflected and can be directed to a substrate to form an image. Such a printing process and its related printer have been described in, e.g., U.S. Pat. Nos. 8,540,350; 8,162,450; and 7,192,121 and U.S. Application Publication No. 2013/0307891 and 2014/0168322.

Figure 1A:
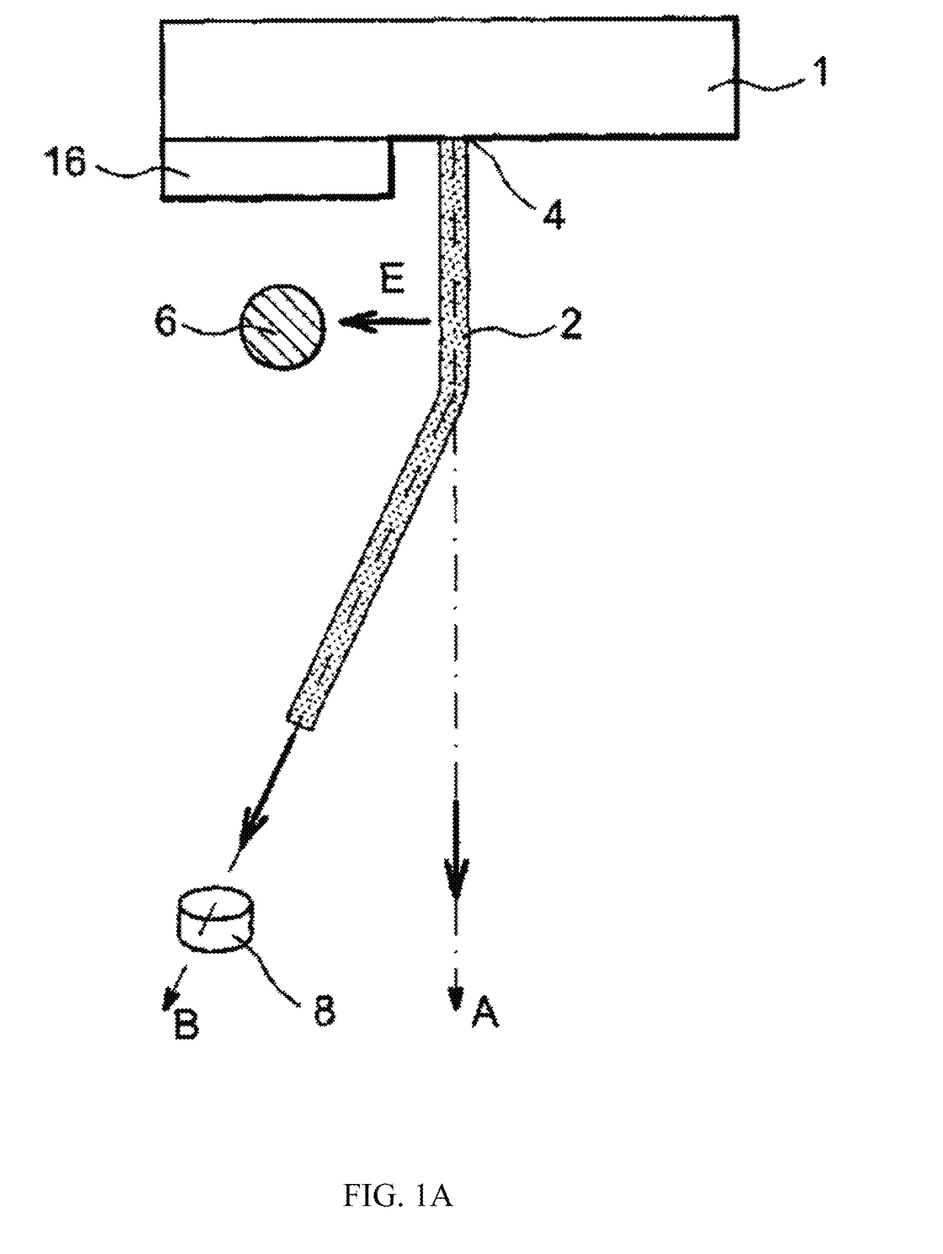
FIGS. 1A and 1B illustrate a process of deflecting a continuous ink stream by an electric field into an ink recovery gutter and projecting un-deflected ink segments to a substrate to form an image.
Figure 1B:
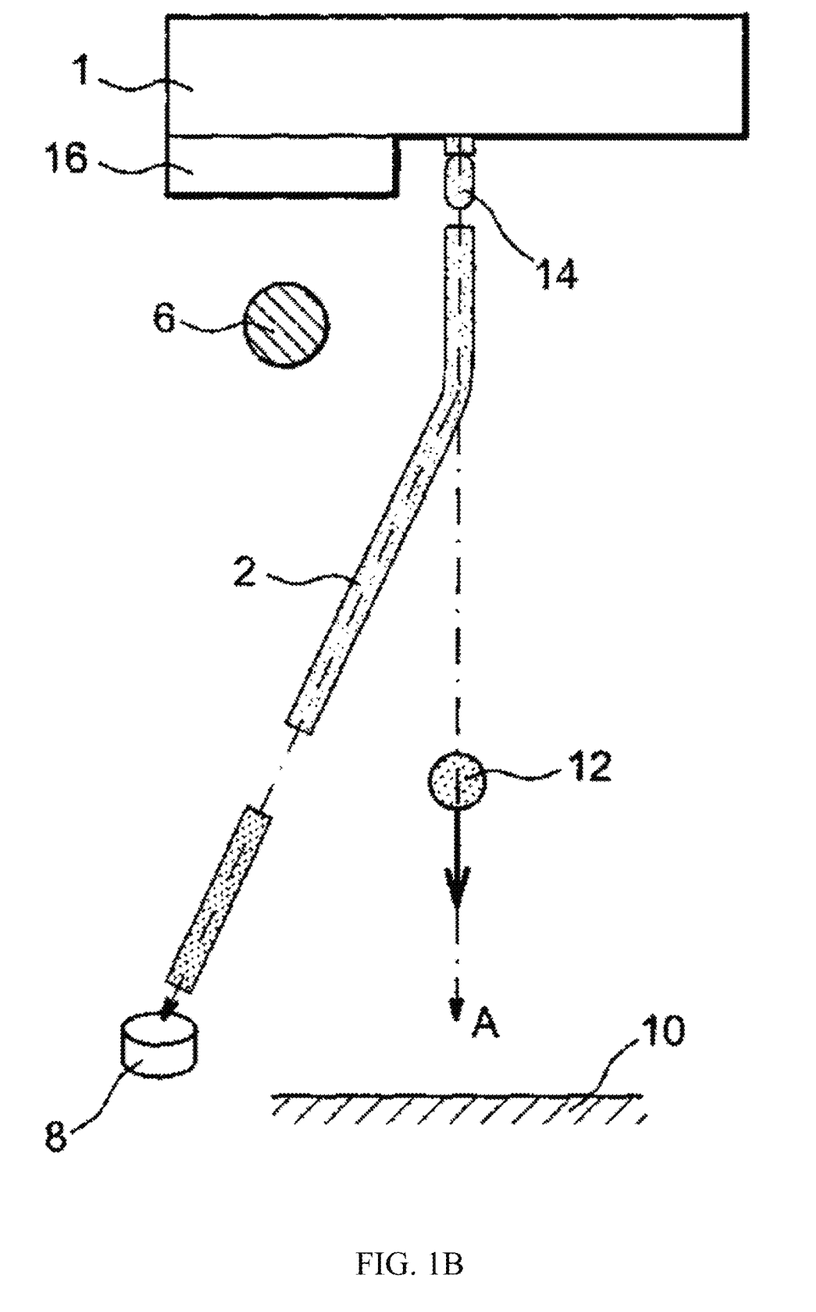
Figure 2A:
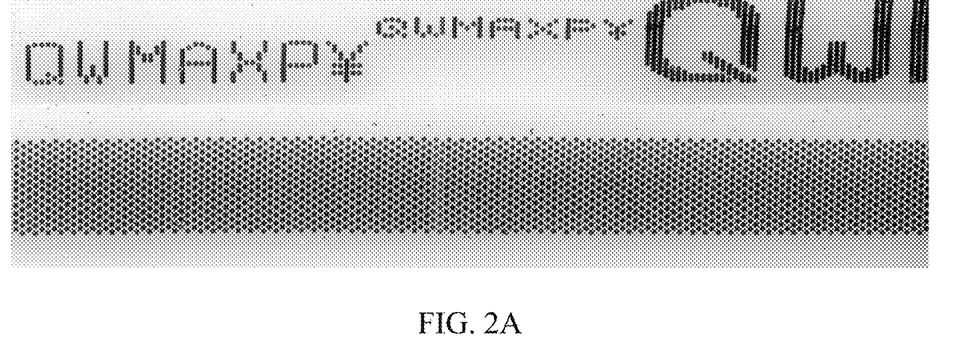
FIG. 2A shows the printing result of an exemplary formulation on polyethylene.
Figure 2B:
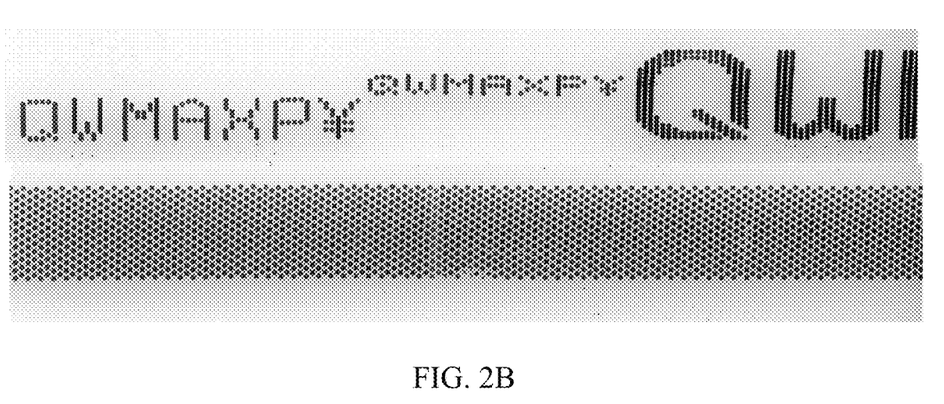
FIG. 2B shows the printing result of an exemplary formulation on polypropylene.
Figure 2C:
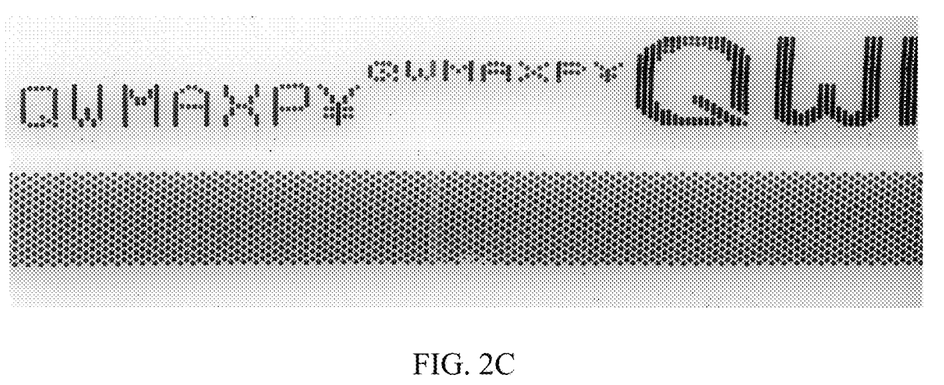
FIG. 2C shows the printing result of an exemplary formulation on biaxially-oriented polypropylene.
Figure 2D:
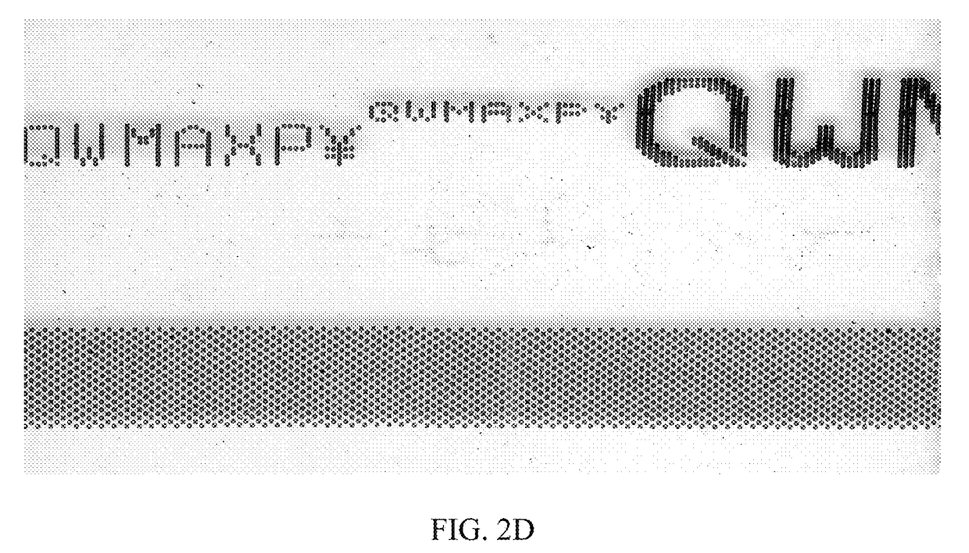
FIG. 2D shows the printing result of an exemplary formulation on polyvinylchloride.
Figure 2E:
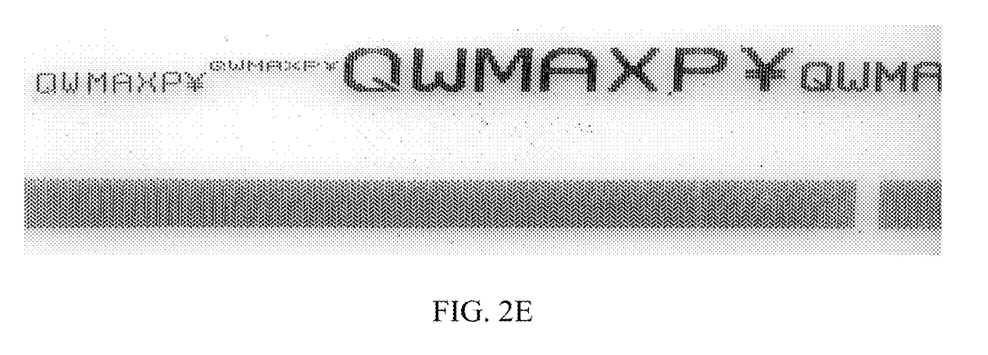
FIG. 2E shows the printing result of an exemplary formulation on polyamide 6.
Figure 2F:
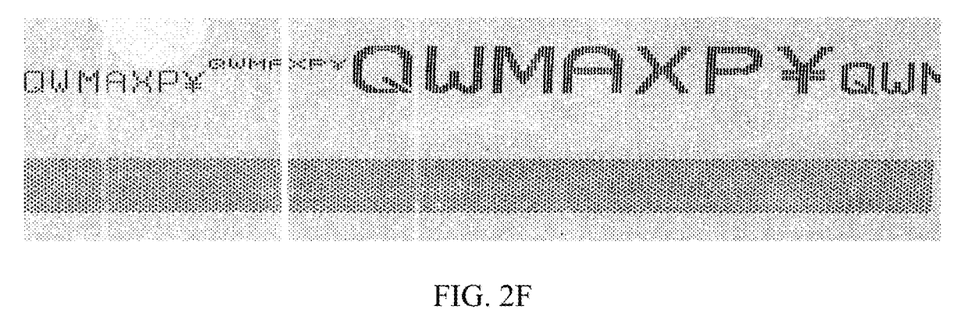
FIG. 2F shows the printing result of an exemplary formulation on aluminum.
Figure 2G:
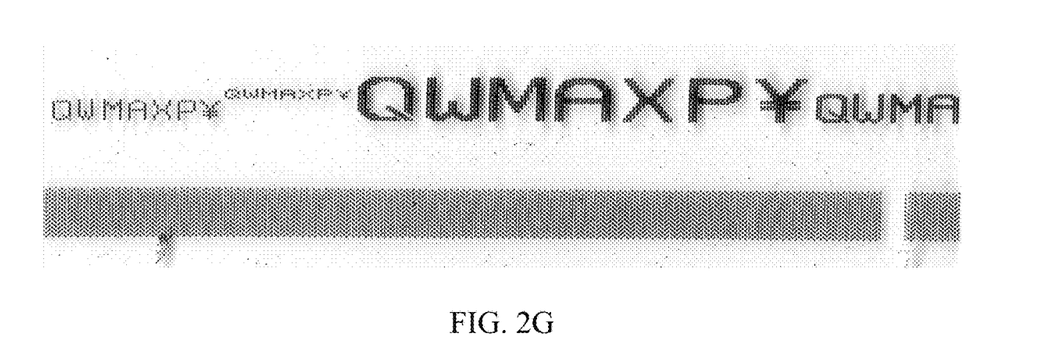
FIG. 2G shows the printing result of an exemplary formulation on glass.
Figure 2H:
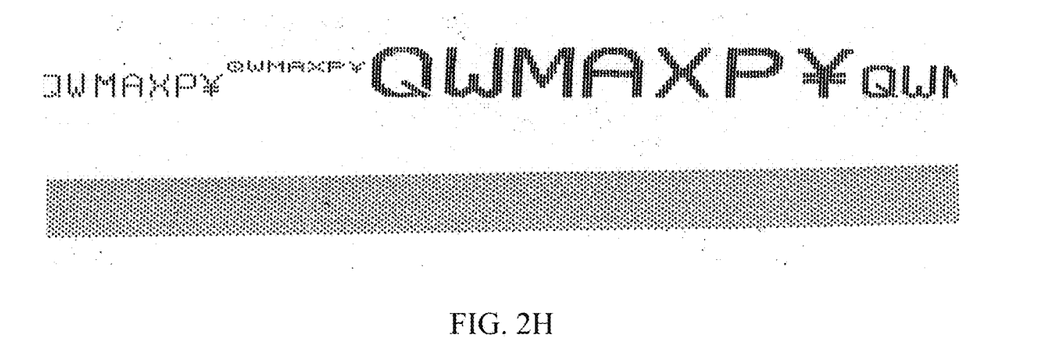
FIG. 2H shows the printing result of an exemplary formulation on cardboard.

FIGS. 1A and 1B further illustrate the principle of the printing process described above. In particular, FIG. 1A illustrates a non-printing situation and FIG. 1B illustrates a printing situation, As shown in FIG. 1A, in the non-printing situation, a drop generator 1, which is, for example, activated by a piezoelectric device, forms a continuous ink stream 2 along a hydraulic trajectory. The ink stream 2 discharged by the nozzle 4 of the generator 1 at a predetermined speed is deflected from the axis A of the nozzle 4, namely the hydraulic trajectory, by an electric field E. The electric field E can be created by an electrode 6, which can include one or more deflection electrodes.

The electrode 6, which can be preferably brought to a high potential, can form a capacitor with the ink stream 2 such that the attractive force between the ink stream 2 and the electrode 6 is primarily dependent on the potential squared difference and on the distance between the ink stream 2 and the electrode 6. The trajectory of the ink stream 2 is therefore modified. On the downstream side of the electrode 6, the ink stream 2 continues its trajectory along the tangent to its trajectory A at the output from the zone of the electric field E and is directed along a deviated trajectory B towards an ink recovery gutter 8. Based on the speed of the ink stream 2, it is possible to determine the angle between the deflected trajectory B and the hydraulic trajectory A, as well as the length of the printhead or the distance between the nozzle 4 and the gutter 8.

As shown in FIG. 1B, in a printing situation, the printing of an ink drop 12 on a substrate 10 requires the ink stream 2 to be broken twice so as to form a segment of liquid 14 which will form, by way of surface tension, the drop 12. The segment 14 is typically short and unaffected by the electric field E. Preferably, it is not subjected to the deflection by the electrode 6 and the break up point of the ink stream 2 is located at the level of a shield. For example, an electrode 16 can be brought to the same potential as the liquid and the nozzle 4, which shields the break up point from the electric field E produced by the deflecting electrode 6, so that the electric charge borne by the short segment 14 is zero, or very low. Consequently, the segment 14 is not, or is very slightly, deflected when it passes in front of the deflecting electrode 6, and its trajectory is close to the hydraulic trajectory A of the ink stream 2 being discharged from the nozzle 4. The formed segment 14 and the resulting drop 12, therefore, are not intercepted by the ink collection gutter 8, but can be directed to a substrate 10 to be printed.

In some embodiments, the printing process can include forming ink drops that are substantially not deflected by at least one deflection electrode and directing the ink drops to an ink recovery gutter. In some embodiments, the printing process can further include deflecting the ink stream by at least one deflection electrode to a substrate to form an image. For example, such a printing process can be used to print an image (e.g., a 3D image or a 2D image on a cardboard) that requires a large amount of inks.

In some embodiments, the printing process can include forming ink drops that are deflected by at least one deflection electrode and directing the ink drops to a substrate to form an image. In such embodiments, the printing process can further include forming an ink stream that is substantially not defected by at least one deflection electrode and directing the ink stream to an ink recovery gutter. In such a printing process, the unused ink stream is not deflected and is directed the ink stream to an ink recovery gutter, while the ink used to form an image is deflected and directed to a substrate to form an image.

In some embodiments, the ink compositions described herein can be used with a continuous inkjet printer (e.g., a liquid ink continuous inkjet printer) that deflects an ink stream by an electric field into an ink recovery gutter and projecting un-deflected ink segments (or ink drops) to a substrate to form an image. In some embodiments, the ink compositions described herein can be used with a continuous inkjet printer (e.g., a liquid ink continuous inkjet printer) that deflects ink segments (or ink drops) by an electric field to a substrate to form an image and projecting un-deflected ink streams into an ink recovery gutter.

This disclosure also features a product that includes a substrate and a solid ink defining an image on the substrate, in which the solid ink includes one of the ink compositions described herein. The substrate can be any suitable materials (e.g., porous or non-porous materials), such as films, coated papers, plastics, metals, and cardboards. In some embodiments, the substrate can be a package material, such as a cardboard (e.g., a corrugated cardboard) or a film (e.g., a shrink wrap).

In some embodiments, the printing process described herein can be a 3D printing process. In such embodiments, the image printed by this process can be a 3D article. In some embodiments, the ink compositions described herein can omit a colorant to print a transparent 3D article.

The contents of all publications cited herein (e.g., patents, patent application publications, and articles) are hereby incorporated by reference in their entirety.

The following examples are illustrative and not intended to be limiting.

Example 1: Preparation of a VOC-Free Ink Compositions and its Testing in a Continuous Inkjet Printing Process VOC-free ink formulation examples 1-10 (FE-1 to FE-10) were prepared by adding a salt (i.e., potassium thiocyanate (KSCN)), a polymer resin (i.e., cellulose acetate butyrate or a Novolac resin), and a dye (i.e., solvent black 29) into a mixture of solvents (i.e., dimethyl carbonate and acetone). After each starting material was added, the mixture was stirred for 30 minutes using a Silverson mixing unit. After each formulation was prepared, its conductivity and viscosity were measured at 20° C. and/or 25° C. The compositions of these formulation examples and their measured properties are summarized in Table 1 below.

TABLE 1

| Components | FE-1 (wt %) | FE-2 (wt %) | FE-3 (wt %) | FE-4 (wt %) | FE-5 (wt %) | FE-6 (wt %) | FE-7 (wt %) | FE-8 (wt %) | FE-9 (wt %) | FE-10 (wt %) |
|---|---|---|---|---|---|---|---|---|---|---|
| Dimethyl carbonate | 68.8 | 65.1 | 60.2 | 56.03 | 55.38 | 61.2 | 52.78 | 43.68 | 50.88 | 71.36 |
| Acetone | 17.2 | 21.7 | 25.8 | 30.17 | 29.82 | 15.3 | 22.62 | 29.12 | 33.92 | 17.84 |
| Cellulose acetate butyrate | 6 | 6 | 8 | 9 | 10 | None | None | None | None | 6 |
| Novolac resin | None | None | None | None | None | 15 | 18 | 22 | 8 | None |
| KSCN | 2 | 1.2 | 1 | 0.8 | 0.8 | 2.5 | 1.6 | 1.2 | 1.2 | 0.8 |
| Solvent Black 29 | 6 | 6 | 5 | 4 | 4 | 6 | 5 | 4 | 6 | 4 |
| Total | 100 | 100 | 100 | 100 | 100 | 100 | 100 | 100 | 100 | 100 |
| Properties | | | | | | | | | | |
| Conductivity (μS/cm, 25° C.) | 863 | 863 | 840 | 780 | 750 | 830 | 892 | 916 | 1734 | 343 |
| Conductivity (μS/cm, 20° C.) | 782 | 784 | 763 | 710 | 682 | 756 | 810 | 832 | 1572 | 378 |
| Viscosity (mPa · s, 20° C.) | 4.3 | 3.9 | 4.8 | 5.3 | 6.2 | 4.8 | 4.9 | 5.6 | 1.7 | 3.3 |

As shown in Table 1, formulation examples FE-1 to FE-8 all exhibited conductivities and viscosities that are suitable for continuous inkjet printing. Without wishing to be bound by theory, it is believed that formula example FE-9 exhibited a relatively low viscosity because it contained a relatively small amount of the Novolac resin. Without wishing to be bound by theory, it is believed that formula example FE-10 exhibited a relatively small conductivity because it contained a relatively small amount of the KSCN salt and a relatively small amount of acetone.

One of the formulation examples FE-1 to FE-10 was evaluated for its printing quality on various substrates including polyethylene, polypropylene, biaxially-oriented polypropylene, polyvinylchloride, polyamide 6, aluminum, glass, and cardboard. The printing was performed by using a Markem-Imaje 9040 alike printer with a Markem-Imaje printhead "L" at a constant jet speed of 20 m/s at room temperature (i.e., from 20° C. to 25° C.). The printhead-object distance was 10 mm. The printing results are shown in FIGS. 2A-2H.

Other embodiments are within the scope of the following claims.

What is claimed is:

1. An inkjet ink composition comprising:
a solvent consisting of dimethyl carbonate and acetone, wherein a weight ratio of the dimethyl carbonate to the acetone is from about 60:40 to about 80:20;
at least one conductive agent;
at least one resin; and
at least one colorant,
wherein the inkjet ink composition is free or substantially free of water, hydrocarbons, acetals, monoesters, carbonate esters other than dimethyl carbonate, non-carbonate esters, alcohols, and ketones other than acetone.

2. The composition of claim 1, wherein the solvent is in an amount of from about 55 wt % to about 95 wt % of the composition.

3. The composition of claim 1, wherein the at least one conductive agent comprises potassium thiocyanate, 1-butyl-3-methylimidazolium thiocyanate, tetraethylammonium tetrafluoroborate, 1-methyl-3-propylimidazolium iodide, potassium hexafluorophosphate, or 1-butyl-3-methylimidazolium tetrafluoroborate.

4. The composition of claim 1, wherein the at least one conductive agent is in an amount of from about 0.05 wt % to about 5 wt % of the composition.

5. The composition of claim 1, wherein the at least one resin comprises a cellulosic resin, a novolac resin, or an acrylic polymer.

6. The composition of claim 1, wherein the at least one resin is in an amount of from about 1 wt % to about 30 wt % of the composition.

7. The composition of claim 1, wherein the at least one colorant is in an amount of from about 1 wt % to about 20 wt % of the composition.

8. The composition of claim 1, wherein the composition releases VOC in an amount at most about 16 wt % of the total weight of the composition or in an amount at most about 80 wt % of the total weight of the solids in the composition.

9. The composition of claim 1, wherein the composition is VOC free.

10. An inkjet ink composition comprising:
a solvent mixture comprising dimethyl carbonate and acetone, wherein the weight ratio of dimethyl carbonate to acetone is from about 50:50 about 80:20;
at least one conductive agent comprising 1-butyl-3-methylimidazolium thiocyanate, tetraethylammonium tetrafluoroborate, 1-methyl-3-propylimidazolium iodide, 1-butyl-3-methylimidazolium tetrafluoroborate, or a combination thereof;
at least one resin; and
at least one colorant.

11. The inkjet ink composition of claim 10, wherein the solvent mixture consists of dimethyl carbonate and acetone.

12. The inkjet ink composition of claim 11, wherein the weight ratio of dimethyl carbonate to acetone is from about 60:40 to about 80:20.

13. The inkjet ink composition of claim 1, wherein the at least one colorant comprises an anthraquinone or perinone red; an anthraquinone blue; an anthraquinone green; a xanthane, quinoline, quinophthalone, pyrazolone, methine, or anthraquinoid yellow; or a black dye.

14. The inkjet ink composition of claim 1, wherein the at least one colorant comprises a pigment blue, a pigment red, a pigment yellow, a pigment black, carbon black, graphite, or a pigment white.

* * * * *

UNITED STATES PATENT AND TRADEMARK OFFICE
CERTIFICATE OF CORRECTION

| | |
|---|---|
| PATENT NO. | : 12,221,551 B2 |
| APPLICATION NO. | : 17/958124 |
| DATED | : February 11, 2025 |
| INVENTOR(S) | : Bodino et al. |

It is certified that error appears in the above-identified patent and that said Letters Patent is hereby corrected as shown below:

In the Claims

In Column 14 Line 15, In Claim 10, after "50:50" insert --to--.

Signed and Sealed this
Eighth Day of April, 2025

Coke Morgan Stewart
*Acting Director of the United States Patent and Trademark Office*